(12) United States Patent
Alam et al.

(10) Patent No.: US 7,069,313 B2
(45) Date of Patent: Jun. 27, 2006

(54) METHODS AND SYSTEMS FOR PREVENTING SOCKET FLOODING DURING DENIAL OF SERVICE ATTACKS

(75) Inventors: Bilal Alam, Bellevue, WA (US); Michael Courage, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/073,792

(22) Filed: Mar. 7, 2005

(65) Prior Publication Data
US 2005/0149760 A1 Jul. 7, 2005

Related U.S. Application Data

(63) Continuation of application No. 09/607,500, filed on Jun. 30, 2000.

(60) Provisional application No. 60/189,096, filed on Mar. 14, 2000.

(51) Int. Cl.
*G06F 15/173* (2006.01)

(52) U.S. Cl. ............... 709/223; 709/224; 709/226; 709/227; 709/229; 709/231; 713/201

(58) Field of Classification Search ............ None
See application file for complete search history.

(56) References Cited

U.S. PATENT DOCUMENTS

| 5,999,965 | A | * | 12/1999 | Kelly | 709/202 |
| 6,427,161 | B1 | * | 7/2002 | LiVecchi | 718/102 |
| 6,574,662 | B1 | * | 6/2003 | Sugiyama et al. | 709/223 |
| 6,738,814 | B1 | * | 5/2004 | Cox et al. | 709/225 |
| 6,751,668 | B1 | * | 6/2004 | Lin et al. | 709/227 |
| 2001/0029548 | A1 | * | 10/2001 | Srikantan et al. | 709/250 |
| 2004/0181694 | A1 | * | 9/2004 | Cox et al. | 713/201 |

* cited by examiner

*Primary Examiner*—Ario Etienne
*Assistant Examiner*—LaShonda Jacobs
(74) *Attorney, Agent, or Firm*—Workman Nydegger (57) ABSTRACT

A way of reducing the impact of denial of service attacks is presented. For each connection request received by a server, the server attempts to establish a connection to accommodate the corresponding request. For each connection request that the server cannot currently handle, the connection request is placed in a backlog queue for future handling. If one or more of the backlog queues have entries, connection sockets that have connections but no received request data are identified and disconnected. Such connection sockets would be highly suspect of being generated as a result of denial of service attacks. Upon disconnection, resources are freed for legitimate requests thereby improving server performance even during denial of service attacks.

5 Claims, 5 Drawing Sheets

METHODS AND SYSTEMS FOR PREVENTING SOCKET FLOODING DURING DENIAL OF SERVICE ATTACKS

CROSS-REFERENCE TO RELATED APPLICATIONS

The present application is a continuation application of commonly-assigned U.S. patent application Ser. No. 09/607,500 filed Jun. 30, 2000, now U.S. Pat. No. 6,904,459 of the same title, which claims the benefit of U.S. provisional application Ser. No. 60/189,096, filed 14 Mar. 2000, both of which are incorporated herein by reference.

BACKGROUND OF THE INVENTION

1. The Field of the Invention

The present invention relates to computer networks. Specifically, the present invention relates to methods and system for preventing socket flooding during denial of service attacks.

2. Background and Relevant Art

Computer networks, and in particular the Internet, have transformed the way people communicate and do business. In these computer networks, computer systems may often communicate using a request/response protocol. For example, a requesting client computer system ("client") will transmit a request for a service to a responding server computer system ("server"). The responding server then uses data from within the request in order to fulfill the request.

For example, a client may compose a request for a Web page. In such a request, there would typically be request data such as the Uniform Resource Locator ("URL") identifying the Web page, the address of the client, and any other data that would be needed or helpful for the server to retrieve the Web page and transmit that Web page to the client. For each request, a typical server would allocate resources such as memory space, processing time or pooled function calls for receiving the request data. Upon processing of the request data, the server would then free up these allocated resources.

While the vast majority of individuals use computer networks in a responsible manner, there are a few individuals who maliciously desire to harm others using computer networks. One particular harmful scheme is to impair the operation of another's server. This may be accomplished by, for example, repeatedly transmitting requests to the server without sending any request data.

Unaware of the malicious nature of the attack, the server will unknowingly attempt to accommodate each request by allocating memory, processing time and/or pooled function calls for each request. However, in the described harmful scheme, since no request data is sent, the server cannot finish processing the request until it has received data from the client. Until it has finished processing the request, the allocated resources are tied up and unavailable for subsequent requests. The server will eventually time out the connection and reclaim the resources after a certain time, but the timeout period is relatively long compared to the time it takes an attacker to flood the computer with requests. Eventually, during this timeout period, the server will deplete its ability to allocate resources resulting in denials of service for subsequent legitimate requests during the timeout period. This effectively shuts down operation of the server during the timeout period resulting in a loss of service for legitimate requests.

Therefore, what are desired are methods and systems for reducing the incidence of service denials due to an attack in which requests are repeatedly made to the server without transmitting any request data.

BRIEF SUMMARY OF THE INVENTION

The present invention relates to methods and systems for preventing or at least reducing the impact of denial of service attacks. Denial of service attacks occur when a client repeatedly sends connection requests to a server without sending corresponding request data. Without adequate protection, the server will allocate resources for each connection request. However, since no request data is sent, the server cannot finish processing the request and sits idle waiting for data from the client. The resources are hence not freed up for subsequent requests. Eventually, the resources are expended to a point where the server cannot respond to any other requests, legitimate or not. Thus, the server is effectively shut down by the denial of service attack.

In accordance with the present invention, an effective method of reducing the impact of denial of service attacks is presented. In one embodiment, the method is implemented in large part using Winsock modules. For each connection request received by the server from one or more clients, the server attempts to establish a connection to accommodate the corresponding request. In the Winsock implementation, the Winsock extension Winsock( )AcceptEx( ) is used to try to establish a connection.

Next, the connection request is mapped to a corresponding listen socket. For each connection request that the server cannot currently handle, the connection request is placed in the backlog queue corresponding to the listen socket to which the connection request mapped. The backlog queues are monitored, for example, by calling a Winsock( )select( ) module and passing in those listen sockets that correspond to the monitored backlog queues. The backlog queues are determined to be used, for example, if the Winsock( )select( ) module returns.

If one or more of the backlog queues have entries, then the method determines which connection sockets have connections but no corresponding request data. This identification may be accomplished using, for example, the Winsock( )getsockopt( ) module. These connection sockets are suspected to be serving a malicious connection request since there is a connection but no request data received which is indicative of a denial of service attack. Thus, these connection sockets are disconnected.

The present invention allows for the early detection of denial of service attacks by immediately taking action once the backlog queue has entries, rather than waiting until the server becomes dysfunctional. If a denial of service attack were to occur, highly suspect connection sockets corresponding to the denial of service attack would be disconnected thereby freeing up resources for legitimate requests. Even if the denial of service attack were to continue, the method would continue to disconnect the maliciously established connections thereby allowing more legitimate connection requests to be satisfied even during the denial of service attack. This improves the security of the server against denial of service attacks and diminishes the malicious motive for generating denial of service attacks in the first place.

There is some risk associated with closing a connection socket simply when it has a connection but no received data. For example, the connection socket may not have been created as a result of a malicious connection request.

Instead, it may be that the connection request was legitimate in that the associated connection socket just happened to be in a stage where the connection was just made but the soon to arrive request data simply has not arrived yet. In this case, a legitimate connection request would be denied.

However, this case would typically be relatively rare. For example, the legitimate connection request would not be denied unless the backlog queue had entries in it which should in itself be relatively rare. Secondly, even though the backlog queue is full, the period of time between the time a connection is made and the time the data is received is relatively brief for a legitimate connection request. Thus, the chance that the legitimate connection request would be executing in that brief period is also relatively small.

Notwithstanding this small risk, the method may be further optimized to reduce the chances for denying legitimate connection requests even further by allowing the systems administrator to specifying a grace period between the time the backlog queue is determined to be used and the time the identified connection sockets are disconnected. If, during this grace period, the server is able to handle the connection requests in the backlog queue, no connection sockets will be disconnected.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE
PREFERRED EMBODIMENTS

The present invention extends to both methods and systems for preventing denial of services due to socket flooding caused by a denial of service attack. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
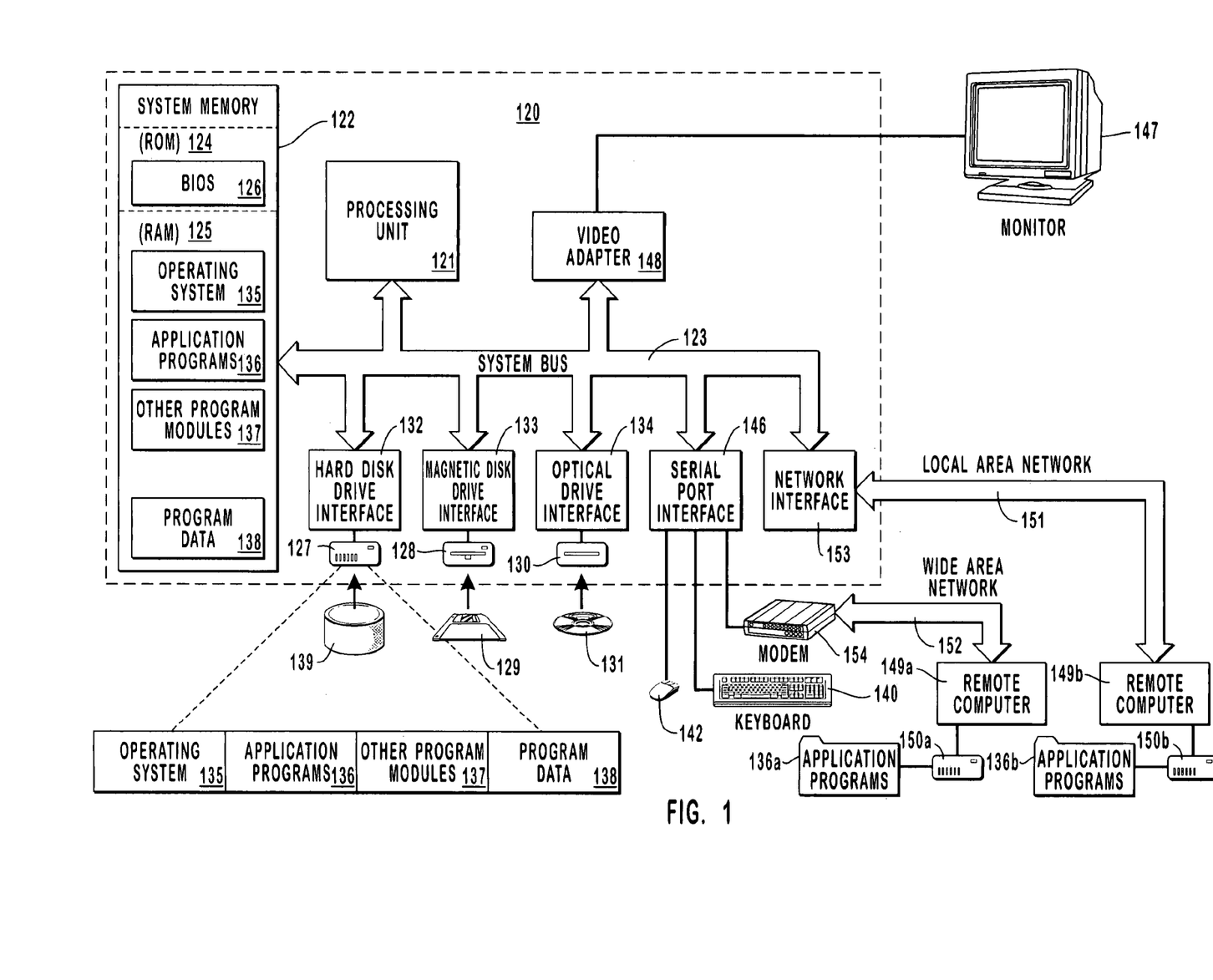
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
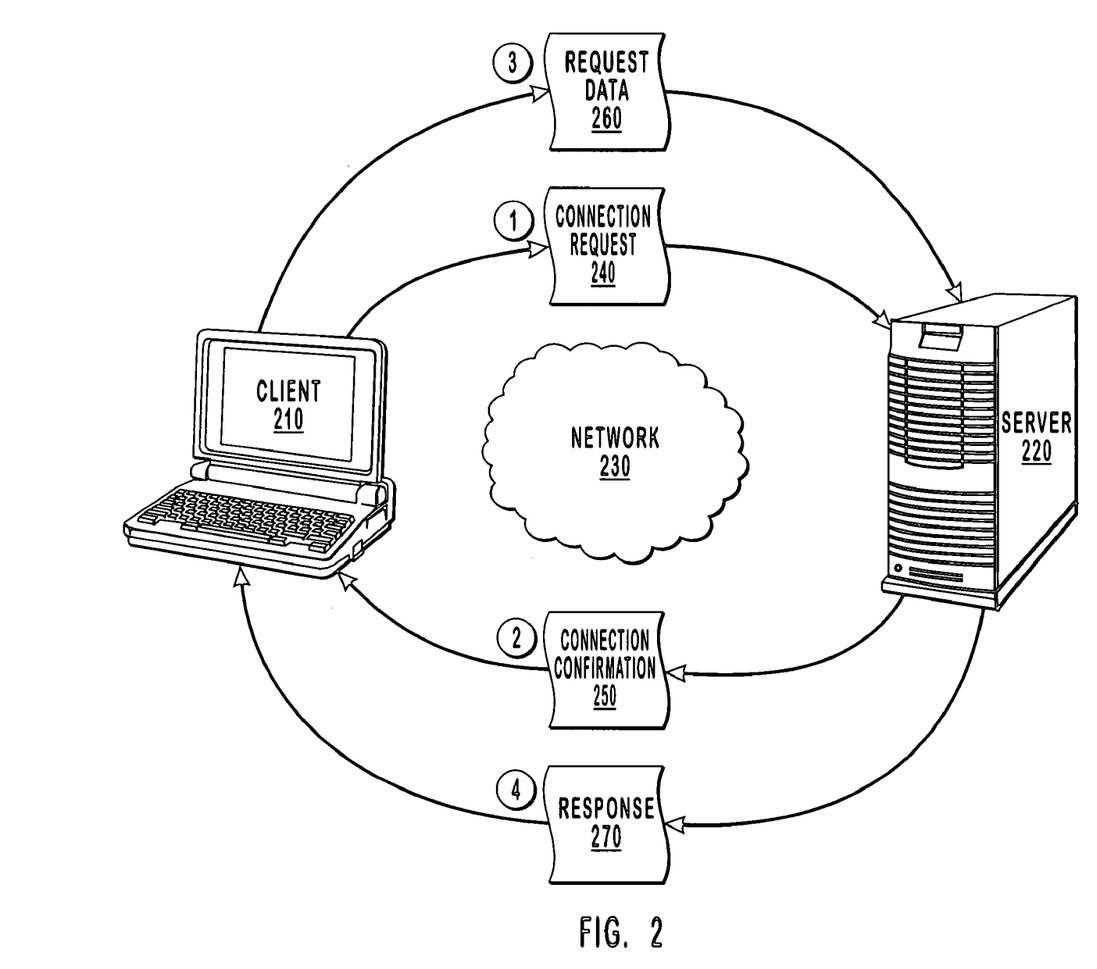
FIG. 2 is schematically illustrates a client and server communicating using a standard request/response protocol.

FIG. 2 illustrates a requesting client computer system 210 (hereinafter, "a client") and a responding server computer system 220 (hereinafter, "a server") which communicate over a network 230. In a typical request/response communication protocol such as HyperText Transport Protocol ("HTTP"), the client 210 transmits a connection request 240 to the server 220 over the network 230. The server 240 then provides a connection in response to the connection request and transmits a connection confirmation message 250 back to the client 210. The client 210 then transmits request data 260 to the server 220. The request data 260 includes information helpful in identifying what the request is as well as information helpful in fulfilling the request. If appropriate for the request, the server 220 then transmits a response 270 back to the client 210 over the network 230.

The server computer system 220 is a "server" computer system in that it provides a service in the form of a connection and a response to the client computer system 210. The server may also obtain the services of other computer systems over the network. In this context, the server 220 may also be a client computer system. The client computer system 210 is a "client" computer system in that it is served by the server providing the connection and generating the response. The client computer system 210 may provide services to yet other computer systems. In this context, the client computer system may also be a server computer system. The client 210 and the server 220 may each be structure similar to the computer 120 or may contain a subset or superset of the elements described above for the computer 120.

Figure 3:
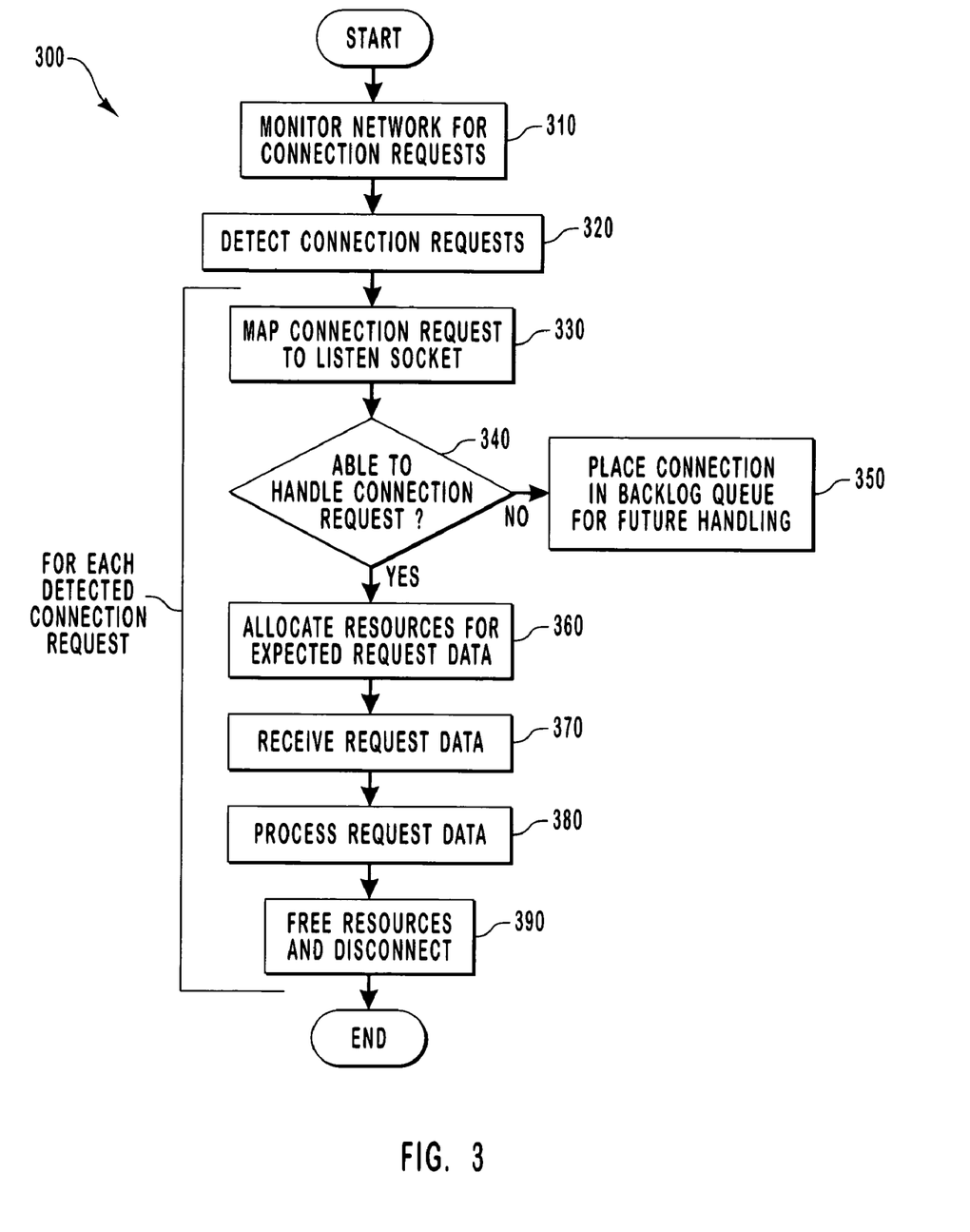
FIG. 3 illustrates a server-implemented process for responding to requests.

FIG. 3 illustrates a flowchart of a method 300 performed by the server 220 when responding to requests from the client 210. The method is initiated by the server 220 monitoring the network 230 for connection requests destined for the server 220 (step 310). The method continues as the server 220 detects such connection requests (step 320). The remainder of the method 300 is performed for each detected connection request.

Figure 4:
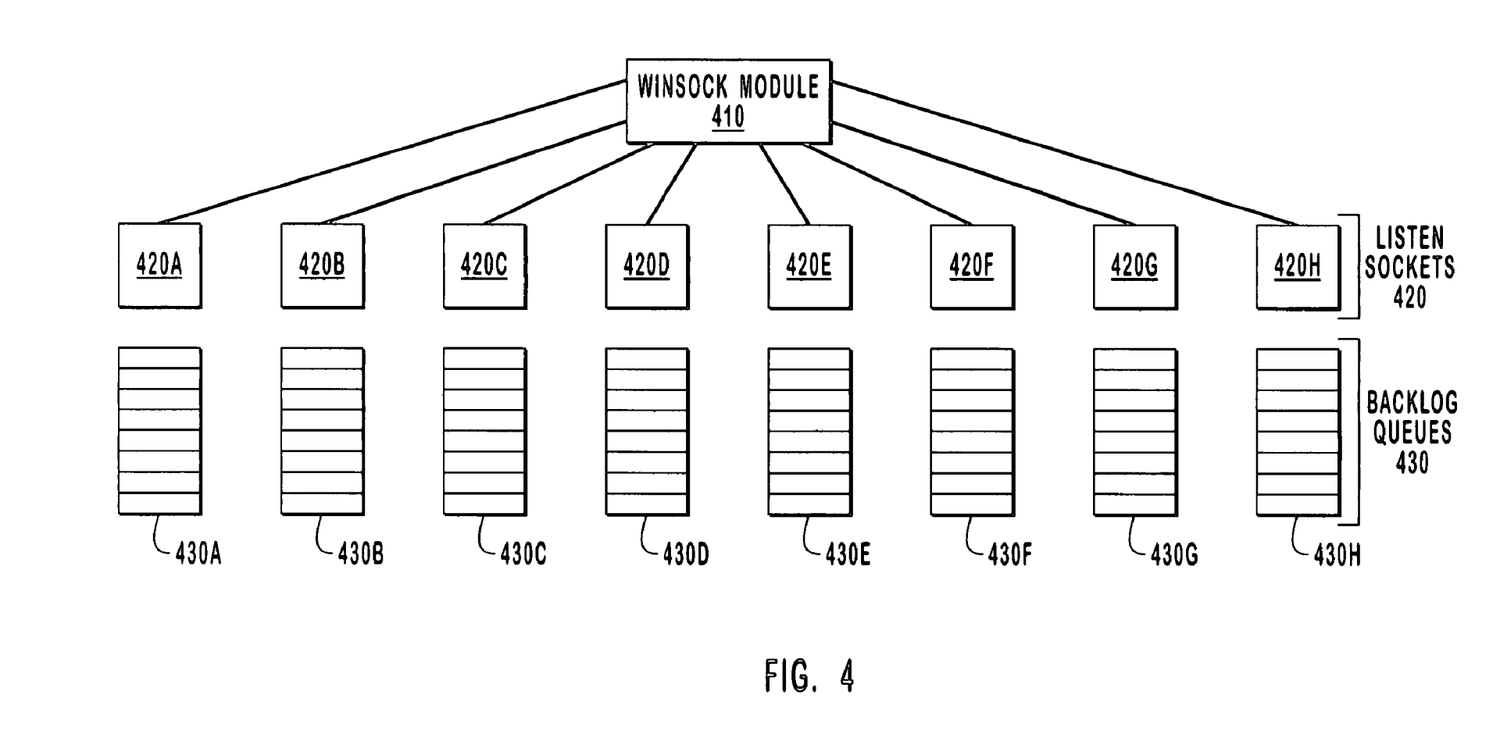
FIG. 4 illustrates a series of listen sockets implements using a Winsock module as existing on a server.

For each connection request, a connection is established using a means or step for establishing a connection request. Specifically, for each connection request, the connection request is mapped to a specific listen socket (step 330). If the server is implementing the WINDOWS® operating system, the server may call a Winsock module to map the request to the listen socket. FIG. 4 schematically illustrates a Winsock module 410 and associated listen sockets 420 and will be used in describing the remaining steps of FIG. 3. As apparent to those of ordinary skill in the art, a listen socket allows the server to listen for the expected request data. The Winsock module may create one or more listen sockets 420A through 420H. Step 330 maps the request to one of these listen sockets 420.

If the server is able to accommodate the connection request ("Yes" in decision block 340), the server allocates resources (step 360) such as memory space, processing time or pooled function calls for receiving and processing the expected request data. The server computer system then receives the request data (step 370) and processes the request data (step 380). Once the server has completed processing the request, the server frees up the previously allocated resources and disconnects (step 390).

On the other hand, if the server 220 is unable to handle the connection request ("No" in decision block 340), then the connection request is placed in a backlog queue for future handling (step 350). As shown in FIG. 4, each listen socket 420A through 420H has a corresponding backlog queue 430A through 430H. If the server cannot handle the connection request, the connection request is passed into the queue corresponding to the listen socket that the connection request mapped to in step 330. Although each listen socket has a request queue in FIG. 4, in an alternative embodiment, a more general backlog queue may be shared between one or more or all of the listen sockets. In this alternative, the server computer system may map the request to the listen socket after the connection request is drawn from the backlog queue during future processing.

The method 300 will now be explained in the context of a WINDOWS® operating system using a Winsock module to establish connections. For each detected connection request, the Winsock module maps the connection request to a listen socket (step 330). To establish a connection to the listen socket, a module may be called that accepts connections and waits for request data before completing. For example, an extension of the Winsock module called Winsock( )AcceptEx( ) is called and the corresponding listen socket is passed in along with the new connection socket that represents the connection to the listen socket. The Winsock( )AcceptEx( ) is completed when request data is beginning to be received from the network in step 370.

Winsock may allocate a pool having a fixed number of Winsock( )Accept( ) calls available for creating new connections. If the entire pool of Winsock( )Accept( ) calls are already processing new connections, then the server is not currently able to satisfy subsequent connection requests ("No" in decision block 340). In this case, the connection request is placed in the backlog queue corresponding to listen socket (step 350).

In normal operation, it should preferably be very rare that the server 220 cannot currently handle a connection request. However, a denial of service attack may often result in the server being unable to currently handle connection requests. In this description and in the claims, a "denial of server attack" is defined as the repetitious transmission of connection requests without a subsequent transmission of request data needed to process the requests. In such a denial of service attack, the method 300 of FIG. 3 will proceed through step 360 in which resources are allocated. However, the server does not receive subsequent request data as in step 370. Therefore, the allocated resources are never freed up in step 390. Since connection requests are repeatedly made, the amount of allocated resources rises until the server can no longer allocate resources and thus must deny legitimate requests for service.

In the context of the Winsock module, the repeated connection requests will result in repeated calls of the Winsock( )AcceptEx( ) module. However, none of the Winsock( )AcceptEx( ) modules will complete since no request data is sent during a denial of service attack. Thus, the pool of Winsock( )AcceptEx( ) modules will gradually deplete. Eventually, the server 220 will not be able to handle new connection requests, legitimate or not, and the connection requests will be placed in the backlog queue. Eventually, the backlog queue will also be filled up and thus new connection requests will not be saved and thus will never be handled.

Figure 5:
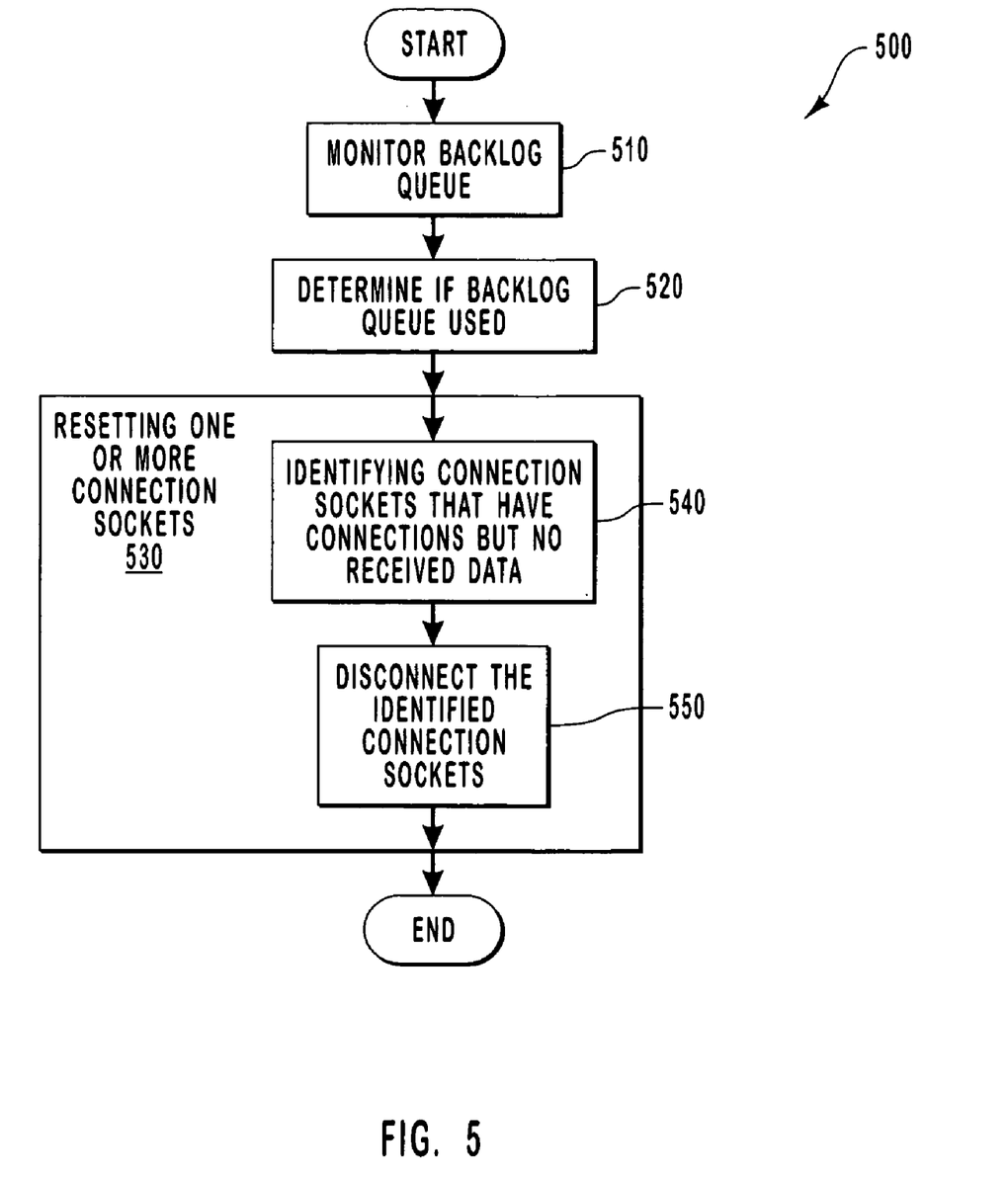
FIG. 5 illustrates a server-implemented method of protecting against or at least reducing the impact of denial of service attacks.

FIG. 5 illustrates a flowchart of a method 500 that prevents or at least reduces the impact of these denial of service attacks. As mentioned above, when the server 220 cannot currently handle a connection request, the connection request is place in a backlog queue. The method 500 monitors this backlog queue (step 510). Accordingly, embodiments within the scope of the present invention include a means and/or step for monitoring the backlog queue. Any method of monitoring the backlog queue will suffice so long as the method is capable of determining whether of not there are entries in the backlog queue. In the example shown in FIG. 4, each listen socket has a corresponding backlog queue. The method 500 may monitor these backlog queues by, for example, calling modules that scan the backlog queues to determine usage. On such module is a Winsock extension called Winsock( )select( ). A list of listen sockets is passed into the Winsock( )select( ) function. The Winsock( )select( ) module monitors the backlog queue of each of the listens sockets in the list of listen sockets passed into the Winsock( )select( ) module.

Next, the method 500 determines if the backlog queue is being used (step 520). Any method for determining that the backlog queue is being used will suffice. In the above example where the Winsock( )select( ) extension of Winsock is used to monitor the backlog queue, the determination is made by the very fact that the Winsock( )select( )extension module returns. The Winsock( )select( ) extension module returns when one or more of the listen sockets have entries in their corresponding backlog queues.

Next, the method 500 resets one or more connection sockets upon notification that the backlog queue is being used (step 530). Accordingly, embodiments within the scope of the present invention include a means and/or step for resetting one or more connection sockets upon notification that the backlog queue is being used.

As part of the step for resetting one or more listen sockets, the method 500 includes a step of determining which connection sockets have established connections, but have not received any data (step 540). In the context of using Winsock, the server computer system 220 enumerates all the connection sockets that have been created using a currently called Winsock( )AcceptEx( ) function. For each of these currently called Winsock( )AcceptEx( ) connection sockets, the extension Winsock( )getsockopt( ) is used to determine whether or not a connection has been established. If a connection has been established, then the connection socket is suspected of being caused by a malicious connection request since a connection has been made, yet no request data has been sent (otherwise, the Winsock( )AcceptEx( ) module would not be currently called but would have been completed). Thus, this connection socket may be disconnected (step 550) since it is assumed that a connection socket having a connection but no request data is most likely the result of a denial of service attack.

There is some risk associated with closing a connection socket simply because it has a connection but no received request data. For example, the connection socket may not have been created as a result of a malicious connection request. Instead, it may be the connection request was legitimate in that the associated connection socket just happened to be in a stage where the connection was just made but the soon to arrive request data simply has not arrived yet. In this case, a legitimate connection request would be denied.

However, this case would typically be relatively rare. For example, the legitimate connection request would not be denied unless the backlog queue had entries in it which should in itself be relatively rare. Secondly, even though the backlog queue is full, the period of time between the time a connection is made and the time the data is received is relatively brief for a legitimate connection request. Thus, the chance that the legitimate connection request would be executing in that brief period is also relatively small. On the other hand, using this method would substantially reduce the impact of denial of service attacks. Thus, the advantages of the method in reducing the impact of denial of service attacks would typically outweigh the relatively small risk of denying legitimate connection requests.

Notwithstanding this small risk, the method may be further optimized to reduce the chances for denying legitimate connection requests even further. For example, the server computer system 220 may be configured to allow for a specified, grace period after entries are detected in the backlog queue before connections are disconnected. If, during this grace period, the server handles the connection requests in the backlog queue, no connection sockets are disconnected.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable media having computer-executable instructions for implementing a method for reducing denials of service during a denial of service attack in a networked environment, wherein the network includes one or more client computer systems that make requests for information from a server computer system, the server computer system providing information in response to the requests from the one or more client computer systems, and the server computer system includes one or more listen sockets and a backlog queue for queuing connection requests that the server computer system cannot currently handle, and wherein the method comprises:

receiving a denial of service attack comprising a plurality of connection requests from a client computer system without receiving any associated request data for the plurality of corresponding connection requests;

establishing a connection socket for at least one of the plurality of connection requests without placing the connection request in a backlog queue;

for each connection request for which the server computer system cannot currently establish a connection socket, placing the connection request in the backlog queue without then establishing a connection socket; and identifying and disconnecting one or more of the connection sockets that are suspected to be serving a malicious connection request and that have not received associated request data for the one or more corresponding connection requests, so as to reduce any affect of the denial of service attack.

2. A computer program product as recited in claim 1, wherein the one or more identified connection sockets are disconnected only upon determining that the backlog queue is being used.

3. A computer program product as recited in claim 2, wherein the one or more identified connection sockets are disconnected only after waiting a predetermined period of time after determining that the backlog queue is being used.

4. A computer program product as recited in claim 1, wherein the backlog queue is capable of containing connection requests that include associated request data and connection requests that do not include associated request data.

5. A computer program product as recited in claim 1, wherein identifying connection sockets that have no received request data includes identifying connection sockets that are suspected to be serving a malicious connection request.

* * * * *